US012774665B1

(12) United States Patent
Akin et al.

(10) Patent No.: US 12,774,665 B1
(45) Date of Patent: Oct. 27, 2026

(54) PREHEATING AIRCRAFT PROPULSION SYSTEM FLUID(S)

(71) Applicant: RTX Corporation, Farmington, CT (US)

(72) Inventors: John Akin, Charlotte, NC (US); Thomas E. Clark, Wells, ME (US); Jung Muk Choe, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/218,327

(22) Filed: May 25, 2025

(51) Int. Cl.
*F01D 25/10* (2006.01)
*F01D 15/10* (2006.01)
*F01D 19/00* (2006.01)

(52) U.S. Cl.
CPC ............. *F01D 25/10* (2013.01); *F01D 15/10* (2013.01); *F01D 19/00* (2013.01); *F05D 2220/323* (2013.01); *F05D 2220/76* (2013.01); *F05D 2260/213* (2013.01); *F05D 2270/303* (2013.01)

(58) Field of Classification Search
CPC .......... F01D 25/10; F01D 19/00; F01D 15/10; F02C 7/16
See application file for complete search history.

(56) References Cited

U.S. PATENT DOCUMENTS

| | | | | |
|---|---|---|---|---|
| 4,696,156 | A * | 9/1987 | Burr | B64D 37/34 60/39.08 |
| 5,152,141 | A | 10/1992 | Rumford | |
| 8,789,377 | B1 * | 7/2014 | Brostmeyer | F02C 7/16 60/806 |
| 10,914,236 | B2 * | 2/2021 | Morioka | F02C 7/224 |
| 10,975,769 | B2 | 4/2021 | Segura Martinez De Ilarduya | |
| 11,261,792 | B2 * | 3/2022 | Niergarth | F01D 11/24 |
| 2005/0155353 | A1 * | 7/2005 | Sabatino | F02C 7/22 60/39.08 |
| 2008/0110596 | A1 * | 5/2008 | Schwarz | F01D 25/08 165/104.11 |
| 2010/0212857 | A1 * | 8/2010 | Bulin | F02C 7/14 165/41 |
| 2019/0153952 | A1 * | 5/2019 | Niergarth | F02C 7/14 |
| 2019/0360401 | A1 * | 11/2019 | Rambo | F02C 7/224 |

* cited by examiner

*Primary Examiner* — Phutthiwat Wongwian
*Assistant Examiner* — Jacek Lisowski
(74) *Attorney, Agent, or Firm* — Getz Balich LLC

(57) ABSTRACT

An aircraft powerplant includes a turbine engine, a first fluid system, an electric machine system, a second fluid system, a heat exchanger and a control system. The first fluid system directs a first fluid through the first fluid circuit using a first fluid pump to service engine components during a warmup mode. The electric machine system includes an electric machine configured to drive operation of the first fluid pump during the warmup mode. The second fluid system directs a second fluid through a second fluid circuit such that electronics heat energy generated by power electronics is transferred into the second fluid and cools the power electronics during the warmup mode. The heat exchanger is configured to transfer the electronics heat energy from the second fluid in the second fluid circuit into the first fluid in the first fluid circuit to heat the first fluid during the warmup mode.

20 Claims, 4 Drawing Sheets

PREHEATING AIRCRAFT PROPULSION SYSTEM FLUID(S)

BACKGROUND OF THE DISCLOSURE

1. Technical Field

This disclosure relates generally to an aircraft and, more particularly, to a working fluid system for an aircraft powerplant.

2. Background Information

An aircraft powerplant may include one or more fluid systems servicing its components and accessories. Various types and configurations of fluid systems are known in the art. While these known fluid systems have various benefits, there is still room in the art for improvement.

SUMMARY OF THE DISCLOSURE

According to an aspect of the present disclosure, a powerplant is provided for an aircraft. This aircraft powerplant includes a turbine engine, a first fluid system, an electric machine system, a second fluid system, a heat exchanger and a control system. The turbine engine includes a plurality of engine components. The first fluid system includes a first fluid circuit and a first fluid pump arranged inline along the first fluid circuit. The first fluid system is configured to direct a first fluid through the first fluid circuit using the first fluid pump to service the engine components during a warmup mode. The electric machine system is arranged with the turbine engine. The electric machine system includes an electric machine and power electronics electrically coupled to the electric machine. The electric machine is configured to drive operation of the first fluid pump during the warmup mode. The second fluid system includes a second fluid circuit. The second fluid system is configured to direct a second fluid through the second fluid circuit such that electronics heat energy generated by the power electronics is transferred into the second fluid and cools the power electronics during the warmup mode. The heat exchanger is configured to transfer the electronics heat energy from the second fluid in the second fluid circuit into the first fluid in the first fluid circuit to heat the first fluid during the warmup mode. The control system is configured to command the powerplant to operate in the warmup mode at least until a temperature of the first fluid is equal to or greater than a threshold temperature.

According to another aspect of the present disclosure, another powerplant is provided for an aircraft. This aircraft powerplant includes a turbine engine, a first fluid system, an electric machine system, a second fluid system, a heat exchanger and a control system. The turbine engine includes a rotating structure and a plurality of engine components. The first fluid system includes a first fluid circuit. The first fluid system is configured to direct a first fluid through the first fluid circuit to service the engine components during a warmup mode. The electric machine system is arranged with the turbine engine and includes a plurality system components. The system components include an electric machine and power electronics electrically coupled to the electric machine. The electric machine is operatively coupled to the rotating structure. A first of the system components is operated at or below forty percent power during the warmup mode. The second fluid system includes a second fluid circuit. The second fluid system is configured to direct a second fluid through the second fluid circuit such that first component heat energy generated by the first of the system components is transferred into the second fluid and cools the first of the system components during the warmup mode. The heat exchanger is configured to transfer the first component heat energy from the second fluid in the second fluid circuit into the first fluid in the first fluid circuit to heat the first fluid during the warmup mode. The control system is configured to operate the powerplant in the warmup mode at least until a temperature of the first fluid is equal to or greater than a threshold temperature.

According to still another aspect of the present disclosure, another powerplant is provided for an aircraft. This aircraft powerplant includes a turbine engine, a first fluid system, an electric machine system, a second fluid system, a heat exchanger and a control system. The turbine engine includes a combustor section, a rotating structure and a plurality of engine components. The combustor section is configured to facilitate powering rotation of the rotating structure at an idle rotational speed during a warmup mode. The first fluid system includes a first fluid circuit. The first fluid system is configured to direct a first fluid through the first fluid circuit to service the engine components during the warmup mode. The electric machine system is arranged with the turbine engine and includes a plurality system components. The system components includes an electric machine and power electronics electrically coupled to the electric machine. The electric machine is operatively coupled to and is configured to be powered by the rotating structure during the warmup mode. The second fluid system includes a second fluid circuit. The second fluid system is configured to direct a second fluid through the second fluid circuit such that first component heat energy generated by a first of the system components is transferred into the second fluid and cools the first of the system components during the warmup mode. The heat exchanger is configured to transfer the first component heat energy from the second fluid in the second fluid circuit into the first fluid in the first fluid circuit to heat the first fluid during the warmup mode. The control system configured to operate the powerplant in the warmup mode at least until a temperature of the first fluid is equal to or greater than a threshold temperature.

The first of the system components may be or otherwise include the electric machine.

The first of the system components may be or otherwise include an electric machine controller configured to control operation of the electric machine. The electric machine controller may include the power electronics.

The electric machine may be operated as an electric motor during the warmup mode.

The electric machine may be operated as an electric generator during the warmup mode.

The first fluid system may also include a first fluid pump arranged inline along the first fluid circuit. The electric machine may also be operatively coupled to and configured to drive operation of the first fluid pump during the warmup mode.

The powerplant may be operated in the warmup mode when the turbine engine is non-operational.

The powerplant may be operated in the warmup mode prior to startup of the turbine engine.

The powerplant may be operated in the warmup mode prior to ignition of combustion in a combustor of the turbine engine.

The powerplant may be operated in the warmup mode during startup of the turbine engine.

The powerplant may be operated in the warmup mode when the turbine engine is operated at engine idle.

The turbine engine may also include a rotating structure. The rotating structure may include a compressor rotor and a turbine rotor. The electric machine may also be configured to drive rotation of the rotating structure at a sub-idle rotational speed during the warmup mode.

The turbine engine may also include a rotating structure. The turbine engine may be operational during the warmup mode. The rotating structure may include a compressor rotor and a turbine rotor. The electric machine may also be configured to boost power to the rotating structure and maintain the rotating structure at an idle rotational speed during the warmup mode.

The electric machine may be operated at equal to or less than thirty percent power during the warmup mode.

The aircraft powerplant may also include an electrical system and an electric machine controller. The electric machine controller may be electrically coupled between the electrical system and the electric machine. The electric machine controller may include the power electronics and may be configured to control operation of the electric machine.

The aircraft powerplant may also include a third fluid system and a second heat exchanger. The third fluid system may include a third fluid circuit. The third fluid system may be configured to direct a third fluid through the third fluid circuit such that machine heat energy generated by the electric machine is transferred into the third fluid and cools the electric machine during the warmup mode. The second heat exchanger may be configured to transfer the machine heat energy from the third fluid in the third fluid circuit into the first fluid in the first fluid circuit to further heat the first fluid during the warmup mode.

The electric machine may be a first electric machine. The electric machine system may also include a second electric machine. The second electric machine may be configured to operate as a generator and provide electrical power to the first electric machine during the warmup mode. The third fluid system may be configured to direct the third fluid through the third fluid circuit such that second machine heat energy generated by the second electric machine is transferred into the third fluid and cools the second electric machine during the warmup mode.

The first fluid may also be heated by the engine components while servicing the engine components during the warmup mode.

The powerplant may be configured as a propulsion system for the aircraft.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
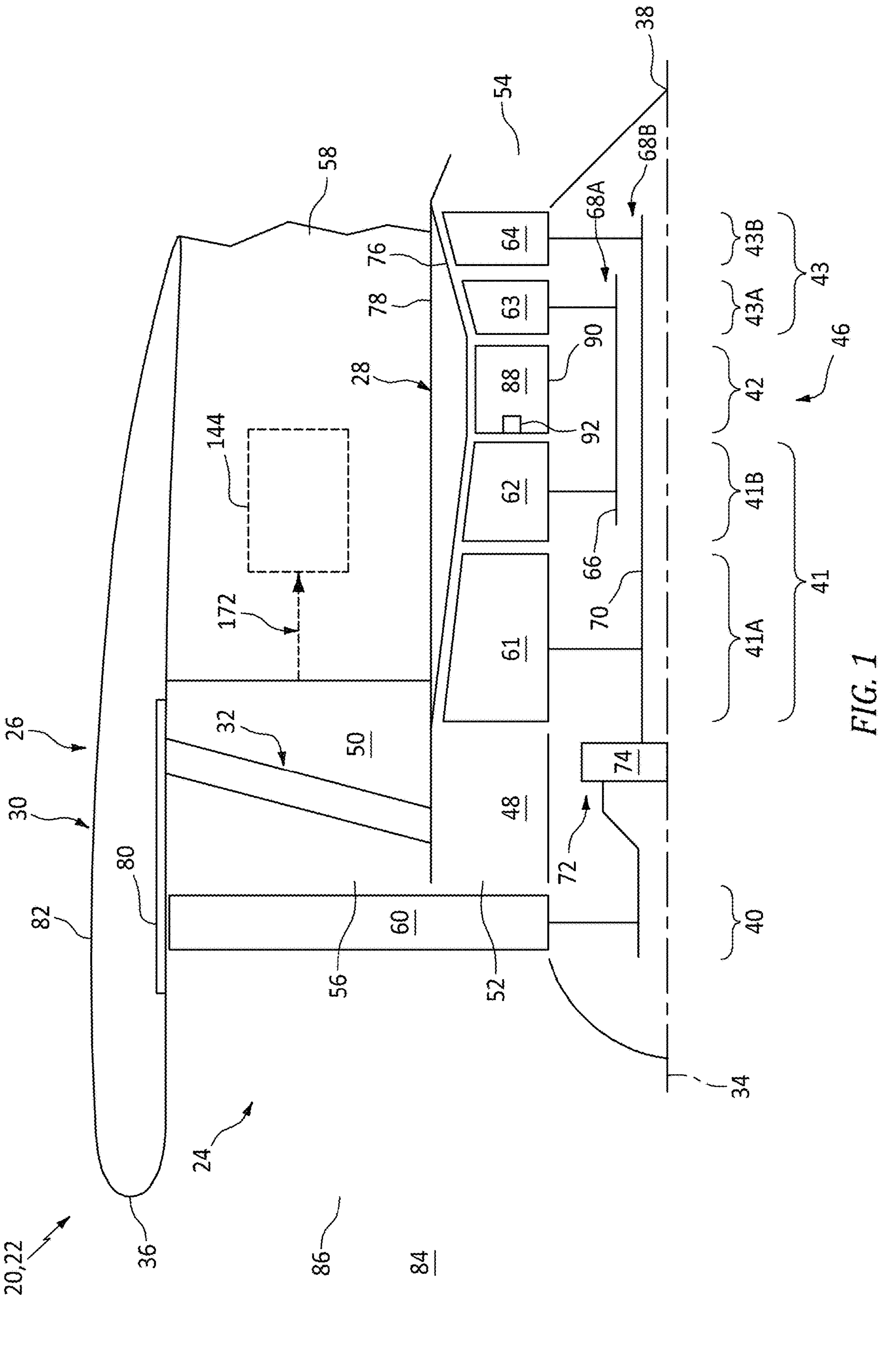
FIG. 1 is a partial schematic illustration of an aircraft propulsion system.

FIG. 1 illustrates a powerplant 20 for an aircraft. The aircraft may be an airplane, a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open propulsor rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 extends axially along an axis 34 of the aircraft propulsion system 22 between an axial upstream, forward end 36 of the aircraft propulsion system 22 and an axial downstream, aft end 38 of the aircraft propulsion system 22. Briefly, the propulsion system axis 34 may be a centerline axis of the aircraft propulsion system 22, the turbine engine 24 and/or one or more of its members. The propulsion system axis 34 may also or alternatively be a rotational axis for one or more members of the turbine engine 24.

The aircraft propulsion system 22 and its turbine engine 24 of FIG. 1 include a propulsor section 40 (e.g., a fan section), a compressor section 41, a combustor section 42 and a turbine section 43. The compressor section 41 of FIG. 1 includes a low pressure compressor (LPC) section 41A and a high pressure compressor (HPC) section 41B. The turbine section 43 of FIG. 1 includes a high pressure turbine (HPT) section 43A and a low pressure turbine (LPT) section 43B. At least (or only) the LPC section 41A, the HPC section 41B, the combustor section 42, the HPT section 43A and the LPT section 43B collectively form a core 46 (e.g., a gas generator) of the turbine engine 24. The aircraft propulsion system 22 and its turbine engine 24 of FIG. 1 also include a core flowpath 48 (e.g., an annular core flowpath) and a bypass flowpath 50 (e.g., an annular bypass flowpath). The core flowpath 48 extends sequentially through the LPC section 41A, the HPC section 41B, the combustor section 42, the HPT section 43A and the LPT section 43B from an airflow inlet 52 into the core flowpath 48 to a combustion products exhaust 54 out from the core flowpath 48. The bypass flowpath 50 extends through a bypass duct from an airflow inlet 56 into the bypass flowpath 50 to an airflow exhaust 58 from the bypass flowpath 50, where the bypass duct may be formed by the inner housing structure 28 and the outer housing structure 30. The bypass flowpath 50 and its bypass duct are configured to bypass (e.g., are disposed radially outboard of and extend along) the engine core 46 and the inner housing structure 28.

The propulsor section 40, the LPC section 41A, the HPC section 41B, the combustor section 42, the HPT section 43A and the LPT section 43B may be arranged sequentially along the propulsion system axis 34 within the propulsion system housing 26. The propulsor section 40 includes a bladed propulsor rotor 60; e.g., a fan rotor. The LPC section 41A includes a bladed low pressure compressor (LPC) rotor 61. The HPC section 41B includes a bladed high pressure compressor (HPC) rotor 62. The HPT section 43A includes a bladed high pressure turbine (HPT) rotor 63. The LPT section 43B includes a bladed low pressure turbine (LPT) rotor 64. Each of these engine rotors 60-64 includes a rotor base (e.g., a disk or a hub) and a plurality of rotor blades (e.g., airfoils, vanes, etc.). The rotor blades may be arranged into one or more stages axially along the respective engine rotor 60-64. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 62 is coupled to and rotatable with the HPT rotor 63. The HPC rotor 62 of FIG. 1, for example, is connected to the HPT rotor 63 through a high speed shaft 66. At least (or only) the HPC rotor 62, the HPT rotor 63 and the high speed shaft 66 collectively form a high speed rotating structure 68A; e.g., a high speed spool of the turbine engine 24 and its engine core 46. This high speed rotating structure 68A of FIG. 1 and its members 62, 63 and 66 are rotatable about the propulsion system axis 34. However, it is contemplated the high speed rotating structure 68A may alternatively be rotatable about another axis radially and/or angularly offset from the rotational axis of the propulsor rotor 60 and/or the centerline axis of the turbine engine 24.

The LPC rotor 61 is coupled to and rotatable with the LPT rotor 64. The LPC rotor 61 of FIG. 1, for example, is connected to the LPT rotor 64 through a low speed shaft 70. At least (or only) the LPC rotor 61, the LPT rotor 64 and the low speed shaft 70 collectively form a low speed rotating structure 68B; e.g., a low speed spool of the turbine engine 24 and its engine core 46. This low speed rotating structure 68B of FIG. 1 and its members 61, 64 and 70 are rotatable about the propulsion system axis 34. However, it is contemplated the low speed rotating structure 68B may alternatively be rotatable about another axis radially and/or angularly offset from the rotational axis of the propulsor rotor 60 and/or the centerline axis of the turbine engine 24.

The low speed rotating structure 68B is coupled to the propulsor rotor 60 through a rotating structure-to-propulsor (RSP) drivetrain 72. The RSP drivetrain 72 may be configured as a geared drivetrain, where a geartrain 74 (e.g., a transmission, a speed change device, an epicyclic geartrain, etc.) is disposed between and operatively couples the propulsor rotor 60 to the low speed rotating structure 68B and its LPT rotor 64. With this arrangement, the propulsor rotor 60 may rotate at a different (e.g., slower) rotational speed than the low speed rotating structure 68B and its LPT rotor 64. Here, the propulsor rotor 60 and the low speed rotating structure 68B may rotate in a common (the same) direction about the propulsion system axis 34 or in opposite directions about the propulsion system axis 34 depending, for example, upon the specific configuration of the geartrain 74. Alternatively, the RSP drivetrain 72 may be configured as a direct-drive drivetrain, where the geartrain 74 is omitted. With such an arrangement, the propulsor rotor 60 rotates at a common (the same) rotational speed as the low speed rotating structure 68B and its LPT rotor 64.

The inner housing structure 28 of FIG. 1 includes an inner case 76 (e.g., a core case) for the turbine engine 24, and an inner nacelle structure 78 (sometimes referred to as an inner fixed structure (IFS)). The inner case 76 is disposed radially outboard of, extends axially along and may circumscribe one or more or all of the engine sections 41A-43B and the engine rotors 61-64. The inner case 76 may thereby house and provide a support structure for the respective engine sections 41A-43B and the engine rotors 61-64. The inner nacelle structure 78 is configured to provide an aerodynamic cover over the engine core 46 and its inner case 76. The inner housing structure 28 and its inner nacelle structure 78 may also form a radial inner peripheral boundary of the bypass flowpath 50.

The outer housing structure 30 of FIG. 1 includes an outer case 80 (e.g., a fan case) for the turbine engine 24 and an outer nacelle structure 82. The outer case 80 is disposed radially outboard of, extends axially along and may circumscribe the propulsor section 40 and its propulsor rotor 60. The outer case 80 may thereby house and may be configured as a containment structure for the propulsor section 40 and its propulsor rotor 60. The outer nacelle structure 82 is configured to provide an aerodynamic cover over the outer case 80. The outer housing structure 30 and its outer nacelle structure 82 may also form a radial outer peripheral boundary of the bypass flowpath 50. Of course, where the aircraft propulsion system 22 is alternatively configured as an open propulsor rotor propulsion system (e.g., the propulsor rotor 60 is an open propulsor rotor), the outer housing structure 30 may be omitted to expose the propulsor rotor 60 to an environment 84 external to the aircraft and its aircraft propulsion system 22.

During operation of the aircraft propulsion system 22 of FIG. 1, ambient air from the external environment 84 enters the aircraft propulsion system 22 and its turbine engine 24 through an airflow inlet 86 into the aircraft propulsion system 22. This air is propelled by the rotating propulsor rotor 60 in a downstream, aft direction towards the propulsion system aft end 38.

An outer stream of the air propelled by the rotating propulsor rotor 60 is directed into the bypass flowpath 50 through its bypass inlet 56, which air entering the bypass flowpath 50 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 58 to provide forward thrust. This propulsion of the bypass air may account for a majority of the forward thrust generated by the aircraft propulsion system 22 and its turbine engine 24 of FIG. 1.

An inner stream of the air propelled by the rotating propulsor rotor 60 is directed into the core flowpath 48 through its core inlet 52, which air entering the core flowpath 48 may be referred to as "core air". This core air is compressed by the LPC rotor 61 and the HPC rotor 62 and is directed into a combustion chamber 88 (e.g., annular combustion chamber) of a combustor 90 (e.g., annular combustor) in the combustor section 42. Fuel is injected into the combustion chamber 88 by one or more fuel injectors 92 and mixed with the compressed core air to provide a fuel-air mixture. This fuel-air mixture is ignited and combustion products thereof flow through and sequentially drive rotation of the HPT rotor 63 and the LPT rotor 64. The rotation of the HPT rotor 63 and the LPT rotor 64 respectively drive rotation of the HPC rotor 62 and the LPC rotor 61 and, thus, compression of the air received from the core inlet 52. The rotation of the LPT rotor 64 also drives rotation of the propulsor rotor 60 through the RSP drivetrain 72.

While the turbine engine 24 is described above with a particular two rotating structure arrangement (e.g., a two-spool architecture), the present disclosure is not limited thereto. For example, the LPC rotor 61 may be omitted to configure the LPT rotor 64 as a power turbine (PT) rotor for the propulsor rotor 60. The turbine engine 24 may also or alternatively include another rotating structure with a bladed compressor rotor in the compressor section 41 and a bladed turbine rotor in the turbine section 43; e.g., an intermediate speed spool for the engine core 46.

Figure 2:
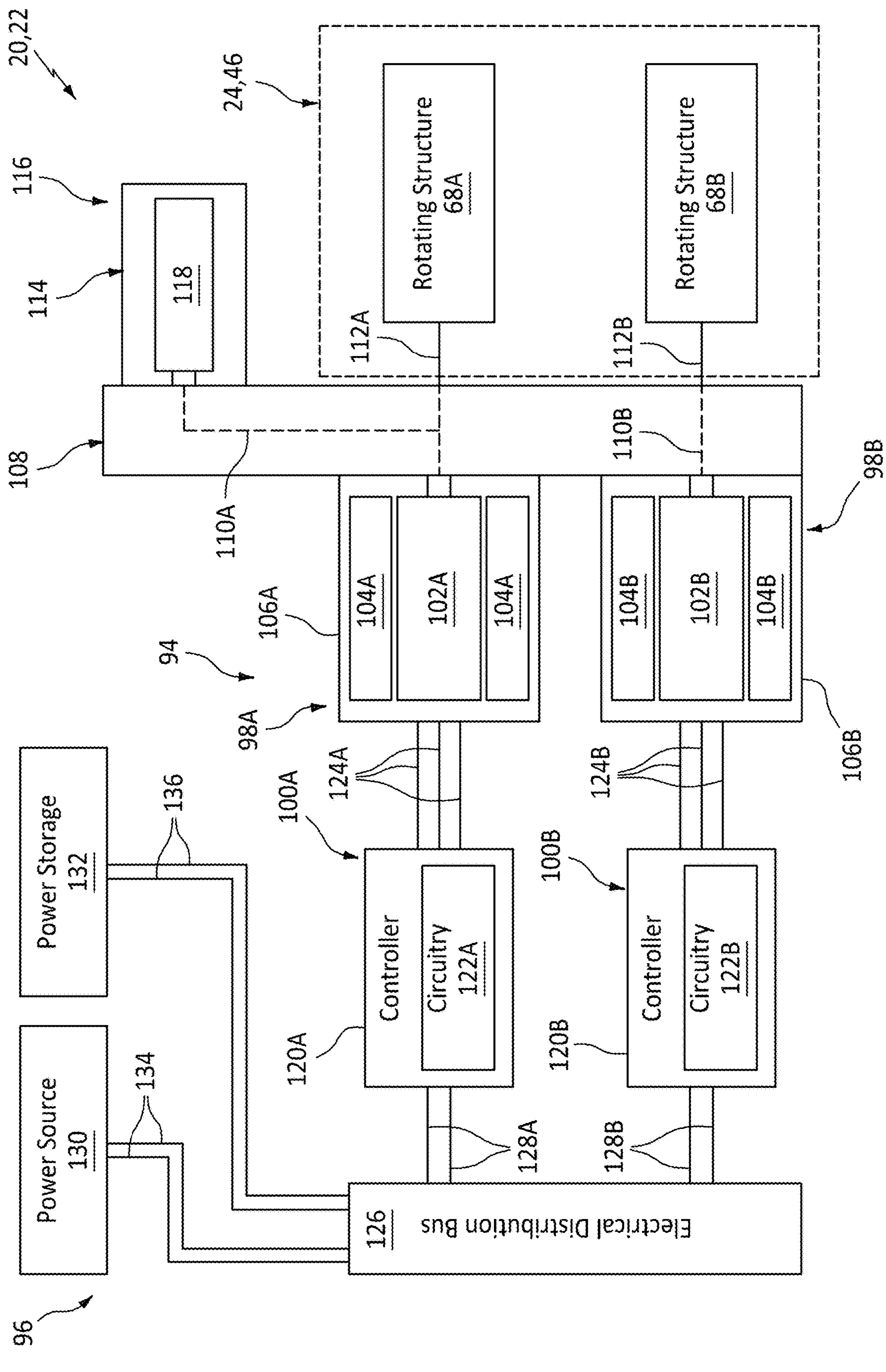
FIG. 2 is a schematic illustration of a portion of the aircraft propulsion system with an electric machine system and an electrical system.

Referring to FIG. 2, the aircraft propulsion system 22 includes an electric machine system 94 electrically coupled to an aircraft electrical system 96. Briefly, this aircraft electrical system 96 may be dedicated to and/or contained within the aircraft propulsion system 22. Alternatively, the aircraft electrical system 96 may also be arranged outside of the aircraft propulsion system 22 and/or service one or more other aircraft components and/or systems; e.g., component(s) and/or system(s) arranged with an airframe of the aircraft, component(s) and/or system(s) arranged with a companion propulsion system, and/or the like.

The electric machine system 94 of FIG. 2 includes one or more electric machines 98A and 98B (generally referred to as "98") and one or more electric machine (EM) controllers 100A and 100B (generally referred to as "100"). For ease of description, each electric machine 98 of FIG. 2 is described below as being electrically coupled to, controlled by and/or otherwise associated with a single, dedicated one of the EM controllers 100. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Each electric machine 98A, 98B of FIG. 2 includes an electric machine rotor 102A, 102B (generally referred to as "102"), an electric machine stator 104A, 104B (generally referred to as "104") and an electric machine housing 106A, 106B (generally referred to as "106"); e.g., a case. The machine rotor 102 is rotatable about a rotational axis of the machine rotor 102, which machine axis may also be an axial centerline of the electric machine 98. The machine stator 104 is disposed next to and in electromagnetic communication with the machine rotor 102. The machine stator 104 of FIG. 2, in particular, is radially outboard of and circumscribes the machine rotor 102. With this arrangement, each electric machine 98 is configured as a radial flux electric machine. The electric machines 98 of the present disclosure, however, are not limited to such an exemplary rotor-stator configuration nor to radial flux arrangements. The machine rotor 102, for example, may alternatively be radially outboard of and circumscribe the machine stator 104. In another example, the machine rotor 102 may be axially next to the machine stator 104 configuring the respective electric machine 98 as an axial flux electric machine. Referring again to FIG. 2, the machine rotor 102 and the machine stator 104 are at least partially or completely housed within an interior of the machine housing 106.

Each electric machine 98A, 98B may be operatively coupled to a respective one of the engine rotating structures 68A and 68B (generally referred to as "68") through a gearbox 108; e.g., an accessory gearbox. Each machine rotor 102A, 102B of FIG. 2, for example, is mechanically coupled to a respective gear system 110A, 110B (generally referred to as "110") of the gearbox 108. Each gearbox gear system 110A, 110B is mechanically coupled to the respective engine rotating structure 68A, 68B through a respective gearbox-to-rotating structure (GRS) drivetrain 112A, 112B (generally referred to as "112"); schematically shown. This GRS drivetrain 112 may be configured as or otherwise include a shaft, a tower shaft assembly, another gearbox (e.g., an angle gearbox), and/or the like. For ease of description, each machine rotor 102 of FIG. 2 is described below as being coupled to and rotatable with a unique one of the engine rotating structures 68 of the aircraft propulsion system 22. However, it is contemplated multiple machine rotors may alternatively be coupled to and rotatable with a common engine rotating structure. It is also contemplated a single one of the machine rotors may be coupled to and rotatable with multiple engine rotating structures, directly or through another device such as a differential or a clutch system.

Figure 3:
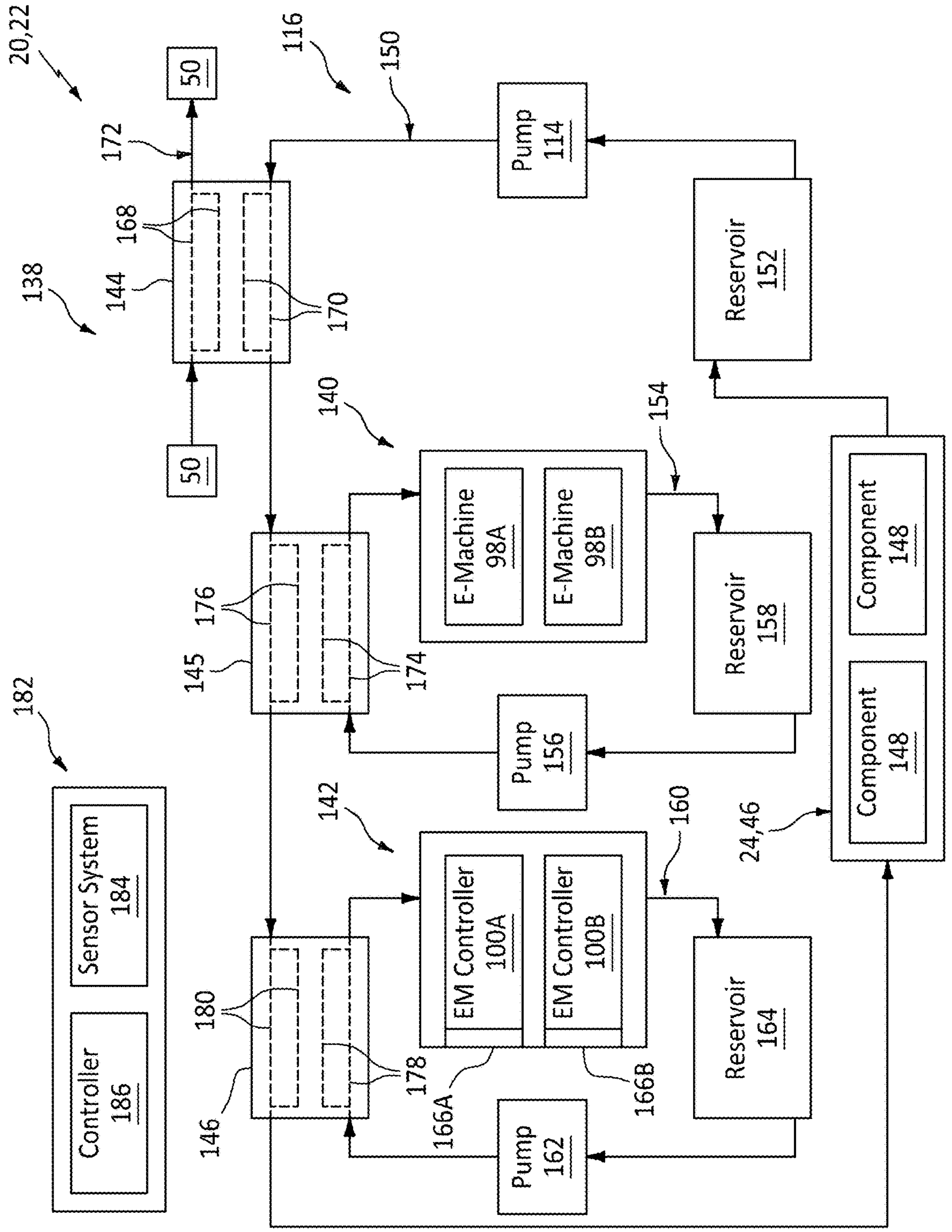
FIG. 3 is a schematic illustration of a portion of the aircraft propulsion system with multiple working fluid systems.

The first electric machine 98A may also be operatively coupled to a turbine engine component (TEC) fluid pump 114 (e.g., a mechanical lubricant pump) for a turbine engine component (TEC) fluid system 116; see also FIG. 3. A turbine engine component (TEC) pump rotor 118 in the TEC fluid pump 114 of FIG. 2, for example, is mechanically coupled to the first gearbox gear system 110A, independent of the high speed rotating structure 68A. This TEC fluid pump 114 of FIG. 2 is mounted to the gearbox 108. The present disclosure, however, is not limited to such an exemplary operable coupling between the first electric machine 98A and its first machine rotor 102A and the TEC fluid pump 114 and its TEC pump rotor 118. Moreover, it is contemplated one or more of the machine rotors 102 may (or may not) also be operatively coupled to one or more other rotating devices through the gearbox 108 and/or the respective GRS drivetrains 112. Examples of these other rotating devices include, but are not limited to, pump rotor(s) for other fluid pump(s), compressor rotor(s) for auxiliary compressor(s), actuator rotor(s) for engine actuator(s), and/or the like.

Each electric machine 98 of FIG. 2 may be configurable as an electric motor and/or an electric generator; e.g., an electric motor-generator. For example, during a motor mode of operation, a respective electric machine 98 may operate as the electric motor to convert electricity received from the aircraft electrical system 96 into mechanical power. The machine stator 104, for example, may generate an electromagnetic field with the machine rotor 102 using a current of electricity received from the aircraft electrical system 96 through the respective EM controller 100. This electromagnetic field may drive rotation of the machine rotor 102. The machine rotor 102, in turn, may provide mechanical power to and drive rotation of the respective engine rotating structure 68 through the respective gearbox gear system 110 and the respective GRS drivetrain 112. This mechanical power may be provided to boost power or completely power the rotation of the respective engine rotating structure 68. The first machine rotor 102A may also provide mechanical power to and drive rotation of (or boost power to) the TEC pump rotor 118 through the first gearbox gear system 110A.

By contrast, during a generator mode of operation, a respective electric machine 98 may operate as the electric generator to convert mechanical power received from the respective engine rotating structure 68 into electricity. Rotation of the machine rotor 102, for example, may be rotationally driven by rotation of the respective engine rotating structure 68 through the respective GRS drivetrain 112 and the respective gearbox gear system 110. The rotation of the machine rotor 102 may generate an electromagnetic field with the machine stator 104, and the machine stator 104 may convert energy from the electromagnetic field into electricity. The respective electric machine 98 may then provide a current of electricity to the aircraft electrical system 96 through the respective EM controller 100 for storage and/or further use. The electric machines 98 of the present disclosure, however, are not limited to such exemplary operation. For example, one or more of the electric machines 98 may alternatively be configured as a dedicated electric motor; e.g., without the electric generator functionality. The second electric machine 98B may still alternatively be configured as a dedicated electric generator; e.g., without the electric motor functionality.

Each EM controller 100A, 100B includes a controller housing 120A, 120B (generally referred to as "120") and internal controller circuitry 122A, 122B (generally referred to as "122"). The controller housing 120 may be configured as an enclosed case (e.g., a closed or sealed container) for the respective controller circuitry 122. The controller circuitry 122 is disposed within an interior of the controller housing 120; e.g., an internal chamber or other volume(s) within and enclosed by the controller housing 120. The controller circuitry 122 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), a processing device, memory, a communication module, electrical transformer(s), electrical rectifier(s), and/or the like.

Each EM controller 100A, 100B is electrically coupled to a respective one of the electric machines 98A, 98B through, for example, one or more electrical couplings 124A, 124B (generally referred to as "124"). The controller circuitry 122 of each EM controller 100 of FIG. 2, for example, is electrically coupled to the respective electric machine 98 and its machine stator 104 through the respective electric couplings 124. Similarly, each EM controller 100A, 100B is electrically coupled to an electrical distribution bus 126 of the aircraft electrical system 96 through, for example, one or more electric couplings 128A, 128B (generally referred to as "128"). The controller circuitry 122 of each EM controller 100 of FIG. 2, for example, is electrically coupled to the aircraft electrical system 96 and its electrical distribution bus 126 through the respective electric couplings 128. Examples of the electrical couplings 124, 128 include, but are not limited to, high voltage electric cables, power feeder cables, power buses, and/or the like.

Each EM controller 100 and its controller circuitry 122 are configured to control operation of a respective one of the electric machines 98. For example, when operating as the electric motor, the respective EM controller 100 and its controller circuitry 122 are configured to regulate a flow of electricity from the aircraft electrical system 96 to the respective electric machine 98. This electricity flow regulation may include: (a) turning-on the flow of electricity from the aircraft electrical system 96 to the respective electric machine 98 (e.g., electrically coupling the respective electric machine 98 to the aircraft electrical system 96); (b) turning-off the flow of electricity from the aircraft electrical system 96 to the respective electric machine 98 (e.g., electrically decoupling the respective electric machine 98 from the aircraft electrical system 96); (c) moderating the flow of electricity from the aircraft electrical system 96 to the respective electric machine 98. Here, the respective EM controller 100 operates as a motor controller. In another example, when operating as the electric generator, the respective EM controller 100 and its controller circuitry 122 are configured to regulate a flow of electricity from the respective electric machine 98 to the aircraft electrical system 96. This electricity flow regulation may include: (a) turning-on the flow of electricity from the respective electric machine 98 to the aircraft electrical system 96 (e.g., electrically coupling the respective electric machine 98 to the aircraft electrical system 96); (b) turning-off the flow of electricity from the respective electric machine 98 to the aircraft electrical system 96 (e.g., electrically decoupling the respective electric machine 98 from the aircraft electrical system 96); (c) moderating the flow of electricity from the respective electric machine 98 to the aircraft electrical system 96. Here, the respective EM controller 100 operates as a generator controller.

The aircraft electrical system 96 includes the electrical distribution bus 126. This aircraft electrical system 96 may also include a power source 130 and/or a power storage 132. The electrical distribution bus 126 is electrically coupled to the electric machines 98 through their respective EM controllers 100 as described above. The electrical distribution bus 126 is also electrically coupled to the power source 130 and the power storage 132 through one or more respective electrical couplings 134 and 136; e.g., high voltage electric cables, power feeder cables, power buses, and/or the like. With this arrangement, the electrical distribution bus 126 provides an intermediate connection between the various electrical members 98A (via 100A), 98B (via 100B), 130 and/or 132. Of course, the electrical distribution bus 126 may also be electrically coupled to one or more additional electric components of the aircraft propulsion system 22 and/or one or more additional electric components of the aircraft outside of the aircraft propulsion system 22; e.g., airframe mounted electric components, etc. Moreover, it is contemplated the electrical distribution bus 126 may (or may not) also be electrically coupled to and provide the intermediate connection with one or more additional electric components of the aircraft propulsion system 22 and/or one or more additional electric components of the aircraft outside of the aircraft propulsion system 22. Examples of the additional electric components of the aircraft propulsion system 22 include, but are not limited to, sensors, actuators, pumps, valves, an electronic engine controller for the turbine engine 24, and/or the like. Examples of the additional electric components of the aircraft outside of the aircraft propulsion system 22 include, but are not limited to, electric devices mounted with an airframe of the aircraft.

The power source 130 is configured to generate electricity and provide that electricity to the electrical distribution bus 126. The power source 130, for example, may be configured as an electric generator powered by the turbine engine 24 (see FIG. 1). In another example, the power source 130 may be configured as an electric generator powered by another aircraft powerplant; e.g., an engine of a companion aircraft propulsion system, an engine of an auxiliary power unit (APU), a fuel cell system, and/or the like.

The power storage 132 is configured to receive electricity from the electrical distribution bus 126 and store that received electricity as potential energy. The power storage 132 is also configured to release the stored potential energy as electricity output into the electrical distribution bus 126. The power storage 132, for example, may be configured as or otherwise include a battery or an array of batteries (e.g., a battery pack). In another example, the power storage 132 may be configured as or otherwise include one or more capacitors; e.g., supercapacitors.

Referring to FIG. 3, the aircraft propulsion system 22 includes a working fluid system 138 configured to thermally regulate (e.g., cool), lubricate and/or otherwise service various components of the aircraft propulsion system 22. This working fluid system 138 includes the TEC fluid system 116, an electric machine (EM) fluid system 140 and a power electronics (PE) fluid system 142. However, it is contemplated the EM fluid system 140 and the PE fluid system 142 may alternatively be integrated into a single electric machine system (EMS) fluid system. Referring again to FIG. 3, the working fluid system 138 also includes one or more heat exchangers 144-146. Briefly, the first heat exchanger 144 is configured to transfer heat energy between a turbine engine component (TEC) fluid circulated in the TEC fluid system 116 and relatively cool air; e.g., bypass air from the bypass flowpath 50 (see FIG. 1). The second heat exchanger 145 is configured to transfer heat energy between an electric machine (EM) fluid circulated in the EM fluid system 140 and the TEC fluid in the TEC fluid system 116. The third heat exchanger 146 is configured to transfer heat energy between a power electronics (PE) fluid circulated in the PE fluid system 142 and the TEC fluid in the TEC fluid system 116. The TEC fluid, the EM fluid and the PE fluid may each be a liquid working fluid such as, but not limited to, lubricant (e.g., oil) and/or coolant. These working fluids may have a common composition; e.g., the same chemical constituent(s). Alternatively, any one or more of the working fluids may have a different composition than another one or more of the other working fluids; e.g., where the working fluid is selected for specific heat transfer and/or lubrication qualities.

The TEC fluid system 116 is configured to thermally regulate (e.g., cool), lubricate and/or otherwise service one or more components 148 for the turbine engine 24 using the TEC fluid. Examples of the engine components 148 include, but are not limited to, bearing(s) supporting the high speed rotating structure 68A (see FIG. 1), bearing(s) supporting the low speed rotating structure 68B (see FIG. 1), bearing(s) supporting the propulsor rotor 60 (see FIG. 1), bearing(s) supporting the RSP drivetrain 72 (see FIG. 1), bearing(s) and/or gear(s) within the geartrain 74 (see FIG. 1), bearing(s) and/or gear(s) within the gearbox 108 (see FIG. 2), bearing(s) supporting the GRS drivetrain(s) 112 (see FIG. 2), actuator(s), lubricated seal member(s), and/or the like. The TEC fluid system 116 is also configured to reject heat energy into air (the bypass air) for removal from the aircraft propulsion system 22. The TEC fluid system 116 of FIG. 3, for example, includes a turbine engine component (TEC) fluid circuit 150 (e.g., a fluid passage), a section of the first heat exchanger 144, a section of the second heat exchanger 145, a section of the third heat exchanger 146, the TEC fluid pump 114 and a turbine engine component (TEC) fluid reservoir 152.

The TEC fluid reservoir 152, the TEC fluid pump 114, the first heat exchanger 144, the second heat exchanger 145 and the third heat exchanger 146 may be arranged inline longitudinally along the TEC fluid circuit 150. The TEC fluid circuit 150 of FIG. 3, for example, serially extends longitudinally through the TEC fluid reservoir 152, the TEC fluid pump 114, the first heat exchanger 144, the second heat exchanger 145 and the third heat exchanger 146 in a closed loop. The TEC fluid circuit 150 of FIG. 3 is also fluidly coupled, extends longitudinally through and/or is arranged in thermal communication with the engine components 148 serviced by the TEC fluid system 116. Some or all of these engine components 148 may be arranged serially along the TEC fluid circuit 150. In addition or alternatively, some or all of the engine components 148 may be arranged in parallel along the TEC fluid circuit 150. The present disclosure, however, is not limited to the exemplary arrangement of components along the TEC fluid circuit 150 shown in FIG. 3. For example, while the TEC fluid pump 114 and the TEC fluid reservoir 152 are downstream of the engine components 148 and upstream of the heat exchangers 144-146 in FIG. 3, the TEC fluid pump 114 and/or the TEC fluid reservoir 152 may alternatively be arranged downstream of the heat exchangers 144-146 and upstream of the engine components 148. Moreover, the TEC fluid system 116 may (or may not) also include one or more additional components arranged along the TEC fluid circuit 150 such as filter(s), sensor(s), additional heat exchanger(s), additional component(s), valve(s), pump(s), etc.

The TEC fluid pump 114 is configured to circulate a flow of the TEC fluid through the TEC fluid circuit 150. The TEC fluid pump 114 of FIG. 3, for example, directs the flow of the TEC fluid from an outlet of the TEC fluid reservoir 152, through the first heat exchanger 144, the second heat exchanger 145, the third heat exchanger 146 and the engine components 148, and back to an inlet of the TEC fluid reservoir 152.

The TEC fluid reservoir 152 is configured to contain a quantity of the TEC fluid before, during and/or after working fluid system operation. The TEC fluid reservoir 152, for example, may be configured as or otherwise include a tank, a cylinder, a pressure vessel, a bladder or any other type of (e.g., liquid) storage container.

The EM fluid system 140 is configured to thermally regulate (e.g., cool), lubricate and/or otherwise service one or more of the electric machines 98 using the EM fluid. The EM fluid system 140 is also configured to reject heat energy into the TEC working fluid. The EM fluid system 140 of FIG. 3, for example, includes an electric machine (EM) fluid circuit 154, a section of the second heat exchanger 145, an electric machine (EM) fluid pump 156 and an electric machine (EM) fluid reservoir 158.

The EM fluid reservoir 158, the EM fluid pump 156 and the second heat exchanger 145 may be arranged inline longitudinally along the EM fluid circuit 154. The EM fluid circuit 154 of FIG. 3, for example, serially extends longitudinally through the EM fluid reservoir 158, the EM fluid pump 156 and the second heat exchanger 145 in a closed loop. The EM fluid circuit 154 of FIG. 3 is also fluidly coupled, extends longitudinally through and/or is arranged in thermal communication with the electric machines 98 serviced by the EM fluid system 140. These electric machines 98 may be arranged serially along the EM fluid circuit 154. Alternatively, the electric machines 98 may be arranged in parallel along the EM fluid circuit 154. The present disclosure, however, is not limited to the exemplary arrangement of components along the EM fluid circuit 154 shown in FIG. 3. For example, while the EM fluid pump 156 and the EM fluid reservoir 158 are downstream of the electric machines 98 and upstream of the second heat exchanger 145 in FIG. 3, the EM fluid pump 156 and/or the EM fluid reservoir 158 may alternatively be arranged downstream of the second heat exchanger 145 and upstream of the electric machines 98. Moreover, the EM fluid system 140 may (or may not) also include one or more additional components arranged along the EM fluid circuit 154 such as filter(s), sensor(s), additional heat exchanger(s), additional component(s), valve(s), pump(s), etc.

The EM fluid pump 156 is configured to circulate a flow of the EM fluid through the EM fluid circuit 154. The EM fluid pump 156 of FIG. 3, for example, directs the flow of the EM fluid from an outlet of the EM fluid reservoir 158, through the second heat exchanger 145 and the electric machines 98, and back to an inlet of the EM fluid reservoir 158. Here, the EM fluid pump 156 may be an electric pump electrically coupled to the aircraft electrical system 96 (see FIG. 2). Alternatively, the EM fluid pump 156 may be a mechanical pump operatively coupled to, for example, the first electric machine 98A (see FIG. 2).

The EM fluid reservoir 158 is configured to contain a quantity of the EM fluid before, during and/or after working fluid system operation. The EM fluid reservoir 158, for example, may be configured as or otherwise include a tank, a cylinder, a pressure vessel, a bladder or any other type of (e.g., liquid) storage container.

The PE fluid system 142 is configured to thermally regulate (e.g., cool) and/or otherwise service the power electronics using the PE fluid. For ease of description, the power electronics are described herein as include at least (or only) one or more of the EM controllers 100. However, it is contemplated the power electronics may also (or alternatively) include one or more other power electronic devices. Examples of these other power electronic devices include, but are not limited to, the electrical distribution bus 126 (see FIG. 2), one or more of the electrical couplings 124, 128, 134, 136 (see FIG. 2), the power source 130 (see FIG. 2), the power storage 132 (see FIG. 2), and/or the like. Referring again to FIG. 3, the PE fluid system 142 is also configured to reject heat energy into the TEC working fluid. The PE fluid system 142 of FIG. 3, for example, includes a power electronics (PE) fluid circuit 160, a section of the third heat exchanger 146, a power electronics (PE) fluid pump 162 and a power electronics (PE) fluid reservoir 164.

The PE fluid reservoir 164, the PE fluid pump 162 and the third heat exchanger 146 may be arranged inline longitudinally along the PE fluid circuit 160. The PE fluid circuit 160 of FIG. 3, for example, serially extends longitudinally through the PE fluid reservoir 164, the PE fluid pump 162 and the third heat exchanger 146 in a closed loop. The PE fluid circuit 160 of FIG. 3 is also fluidly coupled, extends longitudinally through and/or is arranged in thermal communication with the power electronics serviced by the PE fluid system 142. The PE fluid circuit 160 of FIG. 3, for example, may extend longitudinally, in series or in parallel, through integrated coolers of the EM controllers 100 and/or coolers thermally coupled to the EM controllers 100; e.g., see coolers 166A and 166B. The present disclosure, however, is not limited to the exemplary arrangement of components along the PE fluid circuit 160 shown in FIG. 3. For example, while the PE fluid pump 162 and the PE fluid reservoir 164 are downstream of the EM controllers 100 and upstream of the third heat exchanger 146 in FIG. 3, the PE fluid pump 162 and/or the PE fluid reservoir 164 may alternatively be arranged downstream of the third heat exchanger 146 and upstream of the EM controllers 100. Moreover, the PE fluid system 142 may (or may not) also include one or more additional components arranged along the PE fluid circuit 160 such as filter(s), sensor(s), additional heat exchanger(s), additional component(s), valve(s), pump(s), etc.

The PE fluid pump 162 is configured to circulate a flow of the PE fluid through the PE fluid circuit 160. The PE fluid pump 162 of FIG. 3, for example, directs the flow of the PE fluid from an outlet of the PE fluid reservoir 164, through the third heat exchanger 146 and the EM controllers 100, and back to an inlet of the PE fluid reservoir 164. Here, the PE fluid pump 162 may be an electric pump electrically coupled to the aircraft electrical system 96 (see FIG. 2). Alternatively, the PE fluid pump 162 may be a mechanical pump operatively coupled to, for example, the first electric machine 98A (see FIG. 2).

The PE fluid reservoir 164 is configured to contain a quantity of the PE fluid before, during and/or after working fluid system operation. The PE fluid reservoir 164, for example, may be configured as or otherwise include a tank, a cylinder, a pressure vessel, a bladder or any other type of (e.g., liquid) storage container.

The first heat exchanger 144 of FIG. 3 includes one or more internal air circuit passages 168 and one or more internal first turbine engine component circuit (TECC) passages 170. Each of these heat exchanger passages 168, 170 may be partially or completely formed by the first heat exchanger 144. Each of the heat exchanger passages 168, 170 also extends within and/or through the first heat exchanger 144. The air circuit passages 168 in the first heat exchanger 144 may form a section of an air circuit 172 extending longitudinally through the first heat exchanger 144. Briefly, an airflow inlet into the air circuit 172 may be fluidly coupled to an air source such as the bypass flowpath 50 (see also FIG. 1), and an airflow outlet from the air circuit 172 may be fluidly coupled to an air sink such as the bypass flowpath 50 or the external environment 84. Referring still to FIG. 3, the first TECC passages 170 may form a section of the TEC fluid circuit 150 extending longitudinally through the first heat exchanger 144. Within the first heat exchanger 144, the air circuit passages 168 and the first TECC passages 170 may be arranged to configure the first heat exchanger 144 as a crossflow heat exchanger, a counterflow heat exchanger, a parallel flow heat exchanger, or a hybrid heat exchanger with a combination crossflow, counterflow and/or parallel flow arrangement. This first heat exchanger 144 of FIG. 3 is also configured as an air-to-liquid heat exchanger; e.g., an air-to-oil cooler (AOC) for the TEC fluid system 116. The present disclosure, however, is not limited to such an exemplary arrangement. For example, it is contemplated the first heat exchanger 144 may alternatively provide a thermal coupling between the TEC fluid circuit 150 and a fuel circuit configured to deliver fuel to the combustor section 42 and its fuel injectors 92 (see FIG. 1).

The second heat exchanger 145 of FIG. 3 includes one or more internal electric machine circuit (EMC) passages 174 and one or more internal second turbine engine component (TECC) passages 176. Each of these heat exchanger passages 174, 176 may be partially or completely formed by the second heat exchanger 145. Each of the heat exchanger passages 174, 176 also extends within and/or through the second heat exchanger 145. The EMC passages 174 in the second heat exchanger 145 may form a section of the EM fluid circuit 154 extending longitudinally through the second heat exchanger 145. The second TECC passages 176 may form a section of the TEC fluid circuit 150 extending longitudinally through the second heat exchanger 145. Within the second heat exchanger 145, the EMC passages 174 and the second TECC passages 176 may be arranged to configure the second heat exchanger 145 as a crossflow heat exchanger, a counterflow heat exchanger, a parallel flow heat exchanger, or a hybrid heat exchanger with a combination crossflow, counterflow and/or parallel flow arrangement. This second heat exchanger 145 of FIG. 3 is also configured as a liquid-to-liquid heat exchanger; e.g., an oil-to-oil cooler (OOC) for the EM fluid system 140.

The third heat exchanger 146 of FIG. 3 includes one or more internal power electronics circuit (PEC) passages 178 and one or more internal third turbine engine component (TECC) passages 180. Each of these heat exchanger passages 178, 180 may be partially or completely formed by the third heat exchanger 146. Each of the heat exchanger passages 178, 180 also extends within and/or through the third heat exchanger 146. The PEC passages 178 in the third heat exchanger 146 may form a section of the PE fluid circuit 160 extending longitudinally through the third heat exchanger 146. The third TECC passages 180 may form a section of the TEC fluid circuit 150 extending longitudinally through the third heat exchanger 146. Within the third heat exchanger 146, the PEC passages 178 and the third TECC passages 180 may be arranged to configure the third heat exchanger 146 as a crossflow heat exchanger, a counterflow heat exchanger, a parallel flow heat exchanger, or a hybrid heat exchanger with a combination crossflow, counterflow and/or parallel flow arrangement. This third heat exchanger 146 of FIG. 3 is also configured as a liquid-to-liquid heat exchanger; e.g., an oil-to-oil cooler (OOC) for the PE fluid system 142.

During operation of the working fluid system 138, each fluid system 116, 140, 142 services its respective serviced components. For example, the EM fluid circuit 154 is operated to, inter alia, extract heat energy generated by operation of the electric machine(s) 98, whether operating as an electric motor or an electric generator. The heat energy generated by the electric machine(s) 98, for example, is transferred into the EM fluid as that EM fluid is thermally regulating (e.g., cooling), lubricating and/or otherwise servicing the electric machine(s) 98. This heat energy transfer may cool the electric machine(s) 98 while heating the EM fluid. The heat energy may then be transferred out of the heated EM fluid into the TEC fluid through the second heat exchanger 145. This heat energy transfer may cool the EM fluid while heating the TEC fluid.

The PE fluid circuit 160 is operated to, inter alia, extract heat energy generated by operation of the power electronics such as the EM controller(s) 100. The heat energy generated by the EM controller(s) 100, for example, is transferred into the PE fluid as that PE fluid is thermally regulating (e.g., cooling) and/or otherwise servicing the EM controller(s) 100. This heat energy transfer may cool the EM controller(s) 100 (the serviced power electronics) while heating the PE fluid. The heat energy may then be transferred out of the heated PE fluid into the TEC fluid through the third heat exchanger 146. This heat energy transfer may cool the PE fluid while further heating the TEC fluid.

The TEC fluid circuit 150 is operated to, inter alia, extract heat energy generated by operation of the engine component(s) 148, the heat energy received from the EM fluid system 140, and/or the heat energy received from the PE fluid system 142. The heat energy generated by the engine component(s) 148, for example, is transferred into the TEC fluid as that TEC fluid is thermally regulating (e.g., cooling), lubricating and/or otherwise servicing the engine component(s) 148. This heat energy transfer may cool the engine component(s) 148 while further heating the TEC fluid. The heat energy (e.g., from the engine component(s) 148, the EM fluid system 140 and/or the PE fluid system 142) may then be partially or completely transferred out of the heated TEC fluid into the air in the air circuit 172 through the first heat exchanger 144. This heat energy transfer may cool the TEC fluid while heating the air in the air circuit 172. It is contemplated, of course, that the TEC fluid system 116 may include a bypass and/or other means to tailor (e.g., increase, decrease) a quantity of the heat energy transferred out of the TEC fluid through the first heat exchanger 144 and/or otherwise.

Operational control of the aircraft propulsion system 22 and its various members (e.g., 94 and 138) of FIGS. 1-3 is facilitated by a control system 182 as shown in FIG. 3. This control system 182 includes a sensor system 184 and a controller 186. The sensor system 184 is configured to measure various operational parameters for the aircraft propulsion system 22. These operational parameters include, among various others, a temperature of the TEC fluid in the TEC fluid circuit 150. The sensor system 184, for example, may include one or more temperature sensors. The fluid temperature may be measured within the TEC fluid reservoir 152. The fluid temperature may also or alternatively be measured elsewhere along the TEC fluid circuit 150 upstream and/or downstream of the TEC fluid reservoir 152.

The controller 186 of FIG. 3 is configured in signal communication (e.g., hardwired and/or wirelessly coupled) with: the sensor system 184; one or more components of the turbine engine 24 of FIG. 1 (e.g., actuators, pumps, valves, etc.); one or more components of the electric machine system 94 of FIG. 2 (e.g., the EM controllers 100); and/or one or more components of the working fluid system 138 of FIG. 3 (e.g., the EM fluid pump 156 and/or the PE fluid pump 162). The controller 186 may be configured as an onboard engine controller. The controller 186, for example, may be configured as an electronic engine controller (EEC), an electronic control unit (ECU), a full-authority digital engine controller (FADEC), etc. The controller 186 may be implemented with a combination of hardware and software. The hardware may include memory and at least one processing device, which processing device may include one or more single-core and/or multi-core processors. The hardware may also or alternatively include analog and/or digital circuitry other than that described above. The memory is configured to store software (e.g., program instructions) for execution by the processing device, which software execution may control and/or facilitate performance of one or more operations such as those described herein. The memory may be a non-transitory computer readable medium. For example, the memory may be configured as or include a volatile memory and/or a nonvolatile memory.

In cold climates, the TEC fluid within the TEC fluid system 116 of FIG. 3 may become relatively cold while the aircraft is on ground and the aircraft propulsion system 22 is non-operational (e.g., turned off, de-powered) for an extended period of time. The TEC fluid, however, is typically selected to provide certain characteristics (e.g., viscosity, lubricity, etc.) at elevated temperatures such as those experienced during operation of the turbine engine 24 above an idle power setting. Therefore, when the TEC fluid is at or below a threshold temperature, the TEC fluid is ideally heated prior to starting the turbine engine 24 and/or operating the turbine engine 24 above its idle power setting. Such heating may be facilitated by use of auxiliary heaters (e.g., space heaters) which direct warm air into an interior or the inner housing structure 28 (see FIG. 1). However, use of such auxiliary heaters requires additional infrastructure at aircraft airports. Alternatively, the heating may be facilitated by starting up the turbine engine 24 and operating the turbine engine 24 at its idle power setting for an extended period of time. However, operating the turbine engine 24 at the idle power setting for such an extended period of time may significantly increase fuel consumption as well as delay aircraft flight. To address the foregoing challenges, the aircraft propulsion system 22 and its various members (e.g., 94 and 138) of FIGS. 1-3 are configured to operate in a warmup mode which obviates (or reduces) the use of auxiliary heaters, reduces fuel consumption as well as reduces warmup time prior to aircraft flight. An example of such operation is described below with respect to FIG. 4.

Figure 4:
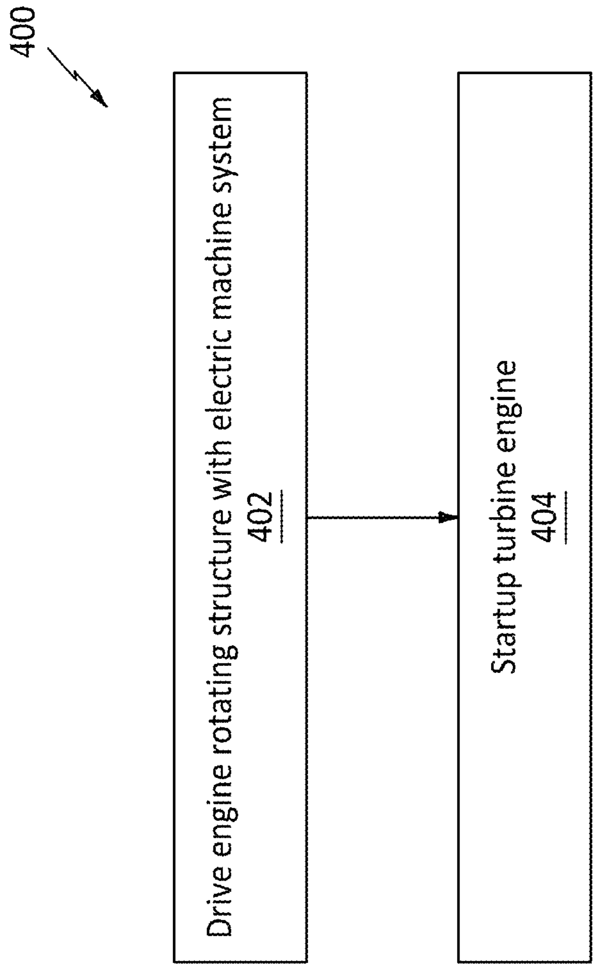
FIG. 4 is a flow diagram of a method for operating an aircraft powerplant such as the aircraft propulsion system during a warmup mode of operation.

FIG. 4 is a flow diagram of a method 400 for operating an aircraft powerplant during a warmup mode of operation. For ease of description, the operating method 400 is described below with respect to the aircraft propulsion system 22 and its various members (e.g., 94 and 138) of FIGS. 1-3. The operating method 400 of the present disclosure, however, is not limited to such an exemplary aircraft powerplant, nor to its exemplary electric machine system or working fluid system.

Prior to performance of the operating method 400 of FIG. 4, the turbine engine 24 is shutdown (non-operational) and at least the temperature of the TEC fluid is below a threshold temperature. While the turbine engine 24 is shutdown, no combustion products are generated, the combustor is flamed out and fuel is not provided to the combustor section 42. The engine rotating structures 68 may also be substantially or completely stationary. Note, under certain conditions, it is contemplated one or more of the engine rotating structures 68 may be rotationally driven by windmilling of the propulsor rotor 60 and/or turned for various purposes post shutdown. Also prior to the performance of the operating method 400 of FIG. 4, the electric machines 98 may be non-operational unless, for example, one or both of these electric machines 98 are utilized for the post shutdown rotating structure turning.

In step 402, the control system 182 signals the electric machine system 94 to drive rotation of at least (or only) the high speed rotating structure 68A and the TEC fluid pump 114. The control system 182, for example, may signal the first EM controller 100A to facilitate operation of the first electric machine 98A as an electric motor at a relatively slow speed. Here, the first electric machine 98A may drive the rotation of the high speed rotating structure 68A at a sub-idle rotational speed. This sub-idle rotational speed is a rotational speed that is less than a speed the high speed rotating structure 68A rotates while the turbine engine 24 is operating at its idle power setting. During such operation, the first electric machine 98A and its first EM controller 100A may be operated at a reduced power setting. This reduced power setting may be equal to or less than forty percent (40%), thirty percent (30%) or even twenty percent (20%) of a (e.g., maximum or average) power setting at which those electric machine system components (e.g., 98A and 100A) are designed to operate during normal (e.g., non-emergency) aircraft flight. Thus, the first electric machine 98A and its first EM controller 100A may be operated in a relatively inefficient power band that generates a relatively high amount of heat energy. The EM fluid system 140 and the PE fluid system 142 transfer this heat energy into the TEC fluid through the second heat exchanger 145 and the third heat exchanger 146, thereby pre-heating the TEC fluid. Moreover, by circulating the TEC fluid with the TEC fluid pump 114 and rotating the high speed rotating structure 68A, the TEC fluid may be further heated by one or more of the engine components 148. The electric machine system 94 may thereby be operated to provide an expedited warm up of the TEC fluid.

In step 404, the control system 182 initiates startup of the turbine engine 24. This turbine engine startup may be initiated after, for example, the control system 182 determines the TEC fluid has been heated to a temperature that is equal to or greater than the threshold temperature. Following the initiation of the turbine engine startup, the first electric machine 98A may speed up the rotation of the high speed rotating structure 68A to a startup speed. A fuel system for the turbine engine 24 may provide fuel to the fuel injectors 92 (see FIG. 1) for injection into the combustion chamber 88. Within the combustion chamber 88, the fuel may mix with air and subsequently be ignited to generate combustion products. Once enough combustion products are produced to maintain or increase the rotational speed of the high speed rotating structure 68A to its idle rotational speed, power to the first electric machine 98A may be cut off. Following this turbine engine startup, the aircraft propulsion system 22 may be operated per normal procedure; e.g., as if the temperature of the TEC fluid was not previously below the threshold temperature.

In some embodiments, the aircraft propulsion system 22 may be operated in the warmup mode prior to turbine engine startup and at least initially during turbine engine startup as described above. In other embodiments, the aircraft propulsion system 22 may continue to operate in the warmup mode while the turbine engine 24 is operating at engine idle. The heat energy from the operation of the electric machine system 94 may thereby be utilized to enhance normal aircraft preflight procedures to preheat the TEC fluid to one or more elevated temperature thresholds. Moreover, by using the electric machine system 94 and at least its first electric machine 98A to boost power input to the high speed rotating structure 68A, the high speed rotating structure 68A may be maintained at or about its idle rotational speed with a reduced fuel burn rate.

In some embodiments, following startup of the turbine engine 24, the electric machine system 94 may be operated to transfer power between the high speed rotating structure 68A and the low speed rotating structure 68B. For example, the first electric machine 98A may be operated as an electric generator and the second electric machine 98B may be operated as an electric motor. Here, electricity generated by the first electric machine 98A may be partially or completely provided to the second electric machine 98B to boost power input into the low speed rotating structure 68B. In another example, the second electric machine 98B may be operated as an electric generator and the first electric machine 98A may be operated as an electric motor. Here, electricity generated by the second electric machine 98B may be partially or completely provided to the first electric machine 98A to boost power input into the high speed rotating structure 68A. With such operation, the electric machines 98 and their EM controllers 100 may continue to operate while the turbine engine 24 is at its idle power setting, which electric machine system operation continues to generate heat energy that can be used to heat the TEC fluid. In other embodiments, one or both of the electric machines 98 may be operated as electric generators, and the electricity may be routed by the electrical distribution bus 126 to the power storage 132 (or other electric devices). Hereto, the electric machines 98 and their EM controllers 100 may continue to operate to generate heat energy that can be used to heat the TEC fluid.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant for an aircraft, comprising:

a turbine engine comprising a plurality of engine components;

a first fluid system comprising a first fluid circuit and a first fluid pump arranged inline along the first fluid circuit, the first fluid system configured to direct a first fluid through the first fluid circuit using the first fluid pump to service the plurality of engine components during a warmup mode;

an electric machine system arranged with the turbine engine, the electric machine system including an electric machine and power electronics electrically coupled to the electric machine, the electric machine configured to drive operation of the first fluid pump during the warmup mode;

a second fluid system comprising a second fluid circuit, the second fluid system configured to direct a second fluid through the second fluid circuit such that electronics heat energy generated by the power electronics is transferred into the second fluid and cools the power electronics during the warmup mode;

a heat exchanger configured to transfer the electronics heat energy from the second fluid in the second fluid circuit into the first fluid in the first fluid circuit to heat the first fluid during the warmup mode; and a control system configured to command the powerplant to operate in the warmup mode at least until a temperature of the first fluid is equal to or greater than a threshold temperature.

2. The powerplant of claim 1, wherein the powerplant is operated in the warmup mode prior to ignition of combustion in a combustor of the turbine engine.

3. The powerplant of claim 1, wherein the powerplant is operated in the warmup mode during startup of the turbine engine.

4. The powerplant of claim 1, wherein the powerplant is operated in the warmup mode when the turbine engine is operated at engine idle.

5. The powerplant of claim 1, wherein the turbine engine further comprises a rotating structure;

the rotating structure comprises a compressor rotor and a turbine rotor; and the electric machine is further configured to drive rotation of the rotating structure at a sub-idle rotational speed during the warmup mode.

6. The powerplant of claim 1, wherein the turbine engine further comprises a rotating structure, and the turbine engine is operational during the warmup mode;

the rotating structure comprises a compressor rotor and a turbine rotor; and the electric machine is further configured to boost power to the rotating structure and maintain the rotating structure at an idle rotational speed during the warmup mode.

7. The powerplant of claim 1, wherein the electric machine is operated at equal to or less than thirty percent power during the warmup mode.

8. The powerplant of claim 1, further comprising:

an electrical system; and an electric machine controller electrically coupled between the electrical system and the electric machine, the electric machine controller comprising the power electronics and configured to control operation of the electric machine.

9. The powerplant of claim 1, further comprising:

a third fluid system comprising a third fluid circuit, the third fluid system configured to direct a third fluid through the third fluid circuit such that machine heat energy generated by the electric machine is transferred into the third fluid and cools the electric machine during the warmup mode; and a second heat exchanger configured to transfer the machine heat energy from the third fluid in the third fluid circuit into the first fluid in the first fluid circuit to further heat the first fluid during the warmup mode.

10. The powerplant of claim 9, wherein the electric machine is a first electric machine, and the electric machine system further comprises a second electric machine;

the second electric machine is configured to operate as a generator and provide electrical power to the first electric machine during the warmup mode; and the third fluid system is configured to direct the third fluid through the third fluid circuit such that second machine heat energy generated by the second electric machine is transferred into the third fluid and cools the second electric machine during the warmup mode.

11. The powerplant of claim 1, wherein the first fluid is further heated by the plurality of engine components while servicing the plurality of engine components during the warmup mode.

12. The powerplant of claim 1, wherein the powerplant is configured as a propulsion system for the aircraft.

13. A powerplant for an aircraft, comprising:

a turbine engine comprising a rotating structure and a plurality of engine components;

a first fluid system comprising a first fluid circuit, the first fluid system configured to direct a first fluid through the first fluid circuit to service the plurality of engine components during a warmup mode;

an electric machine system arranged with the turbine engine and comprising a plurality system components, the plurality of system components including an electric machine and power electronics electrically coupled to the electric machine, and the electric machine operatively coupled to the rotating structure, wherein a first of the plurality of system components is operated at or below forty percent power during the warmup mode;

a second fluid system comprising a second fluid circuit, the second fluid system configured to direct a second fluid through the second fluid circuit such that first component heat energy generated by the first of the plurality of system components is transferred into the second fluid and cools the first of the plurality of system components during the warmup mode;

a heat exchanger configured to transfer the first component heat energy from the second fluid in the second fluid circuit into the first fluid in the first fluid circuit to heat the first fluid during the warmup mode; and a control system configured to operate the powerplant in the warmup mode at least until a temperature of the first fluid is equal to or greater than a threshold temperature.

14. The powerplant of claim 13, wherein the first of the plurality of system components comprises the electric machine.

15. The powerplant of claim 13, wherein the first of the plurality of system components comprises an electric machine controller configured to control operation of the electric machine, and the electric machine controller comprises the power electronics.

16. The powerplant of claim 13, wherein the electric machine is operated as an electric motor during the warmup mode.

17. The powerplant of claim 13, wherein the electric machine is operated as an electric generator during the warmup mode.

18. The powerplant of claim 13, wherein the first fluid system further comprises a first fluid pump arranged inline along the first fluid circuit; and the electric machine is further operatively coupled to and configured to drive operation of the first fluid pump during the warmup mode.

19. A powerplant for an aircraft, comprising:

a turbine engine comprising a combustor section, a rotating structure and a plurality of engine components, the combustor section configured to facilitate powering rotation of the rotating structure at an idle rotational speed during a warmup mode;

a first fluid system comprising a first fluid circuit, the first fluid system configured to direct a first fluid through the first fluid circuit to service the plurality of engine components during the warmup mode;

an electric machine system arranged with the turbine engine and comprising a plurality system components, the plurality of system components including an electric machine and power electronics electrically coupled to the electric machine, and the electric machine operatively coupled to and configured to be powered by the rotating structure during the warmup mode;

a second fluid system comprising a second fluid circuit, the second fluid system configured to direct a second fluid through the second fluid circuit such that first component heat energy generated by a first of the plurality of system components is transferred into the second fluid and cools the first of the plurality of system components during the warmup mode;

a heat exchanger configured to transfer the first component heat energy from the second fluid in the second fluid circuit into the first fluid in the first fluid circuit to heat the first fluid during the warmup mode; and a control system configured to operate the powerplant in the warmup mode at least until a temperature of the first fluid is equal to or greater than a threshold temperature.

20. The powerplant of claim 19, wherein the first of the plurality of system components comprises the electric machine.

* * * * *